United States Patent [19]
Sundseth

[11] Patent Number: 5,984,615
[45] Date of Patent: Nov. 16, 1999

[54] ROLLER DRIVE UNIT

[76] Inventor: Jarl Gailon Sundseth, Rothendaschweg 12a, Schliersee, Germany, D-83727

[21] Appl. No.: 08/811,295

[22] Filed: Mar. 4, 1997

[30] Foreign Application Priority Data

Mar. 4, 1996 [DE] Germany .......................... 196 08 236
Feb. 3, 1997 [DE] Germany .......................... 197 03 979

[51] Int. Cl.$^6$ .................................................. B65G 13/02
[52] U.S. Cl. .................... 414/534; 414/531; 414/535; 198/782; 198/788; 244/137.1
[58] Field of Search ..................... 198/782, 788, 198/722; 414/535, 534, 533, 532, 531, 530, 529; 244/137.1

[56] References Cited

U.S. PATENT DOCUMENTS

| | | |
|---|---|---|
| 3,690,440 | 9/1972 | Maepherson . |
| 3,698,539 | 10/1972 | Schwarzbeck ........................... 198/782 |
| 3,712,454 | 1/1973 | McKee ..................................... 198/782 |
| 3,737,022 | 6/1973 | DeNeefe et al. ......................... 198/782 |
| 4,697,694 | 10/1987 | Huber ...................................... 198/782 |
| 5,048,672 | 9/1991 | Sundseth ................................. 198/782 |
| 5,568,858 | 10/1996 | Thompson ........................... 198/782 X |
| 5,660,268 | 8/1997 | Paauwe et al. .......................... 198/782 |
| 5,803,234 | 9/1998 | Podkanski et al. ...................... 198/782 |

FOREIGN PATENT DOCUMENTS

| | | |
|---|---|---|
| 0 149 658 | 7/1985 | European Pat. Off. . |
| 1 956 946 | 11/1970 | Germany . |
| 3724126C2 | 2/1989 | Germany . |
| 88 16 438 | 10/1989 | Germany . |
| 3911214C2 | 10/1990 | Germany . |
| 39 42 381 | 1/1991 | Germany . |
| 41 02 424 | 7/1992 | Germany . |
| 4336978C2 | 5/1995 | Germany . |

Primary Examiner—David A. Bucci
Assistant Examiner—Gerald J. O'Connor
Attorney, Agent, or Firm—Jacobson, Price, Holman & Stern, PLLC

[57] ABSTRACT

A roller drive unit with a roller, a motor to drive the roller, a drive shaft coupled to the motor, and a gear system to couple the roller to the drive shaft. The gear system has a drive gear coupled in a non-rotating manner to the drive shaft, and a driven gear coupled to the roller on the one hand and to the drive gear on the other. The drive unit also includes a support element on which the roller is supported in a rotary manner and which is in turn rotatable about the axis of the roller, a device for limiting the angular range about which the support element rotates, and a supporting device for receiving the force acting by means of a load on the roller. The support element carries at least one eccentric cam supported on a cam support.

13 Claims, 4 Drawing Sheets

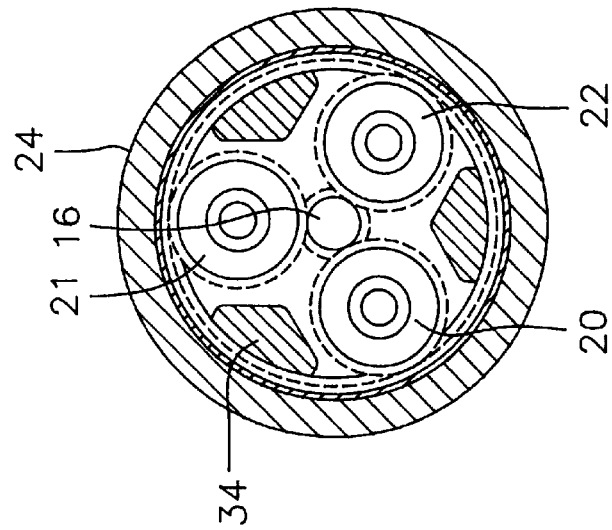
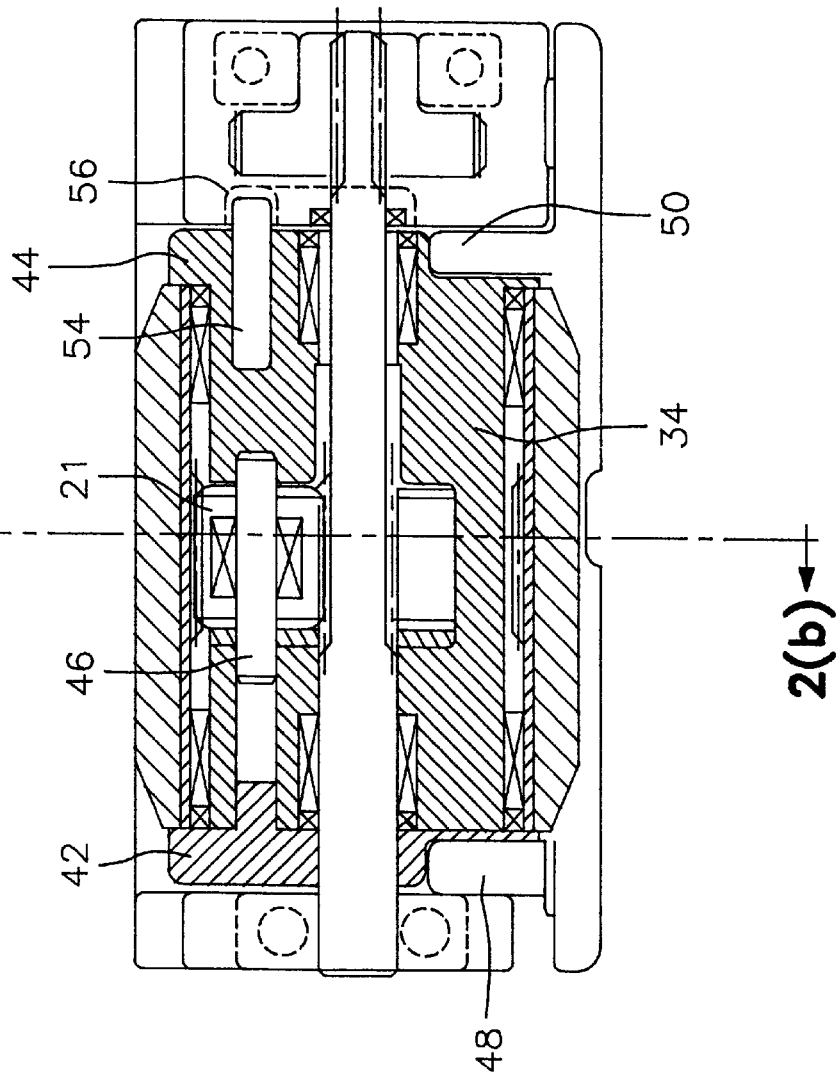

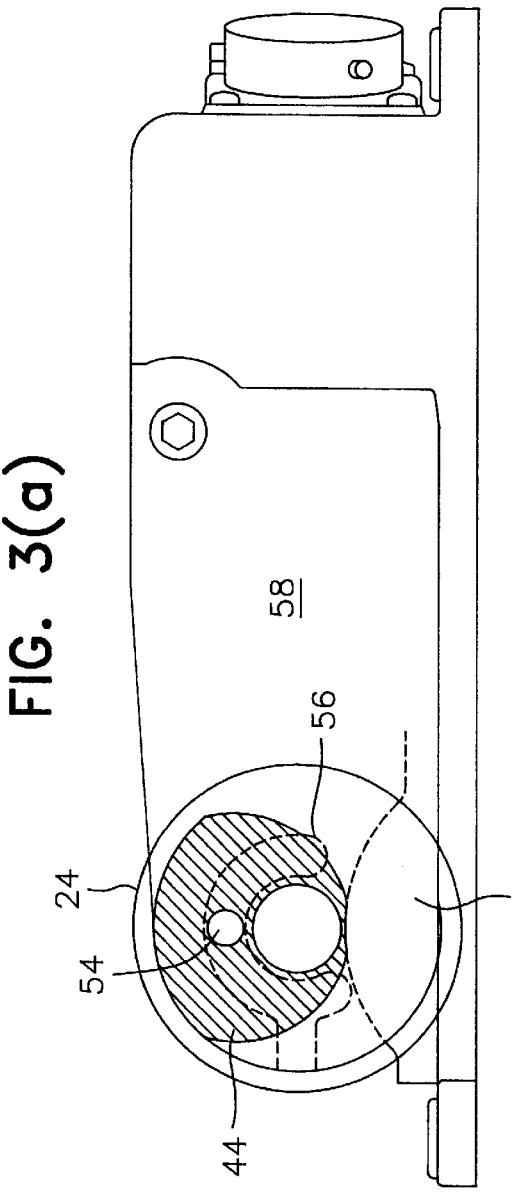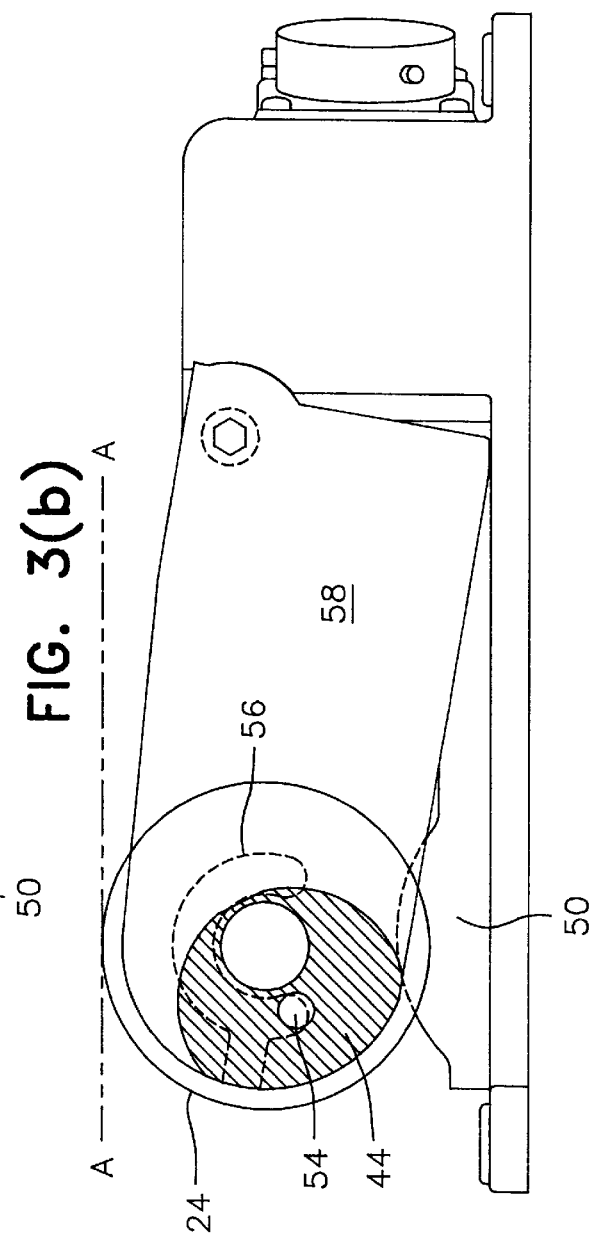

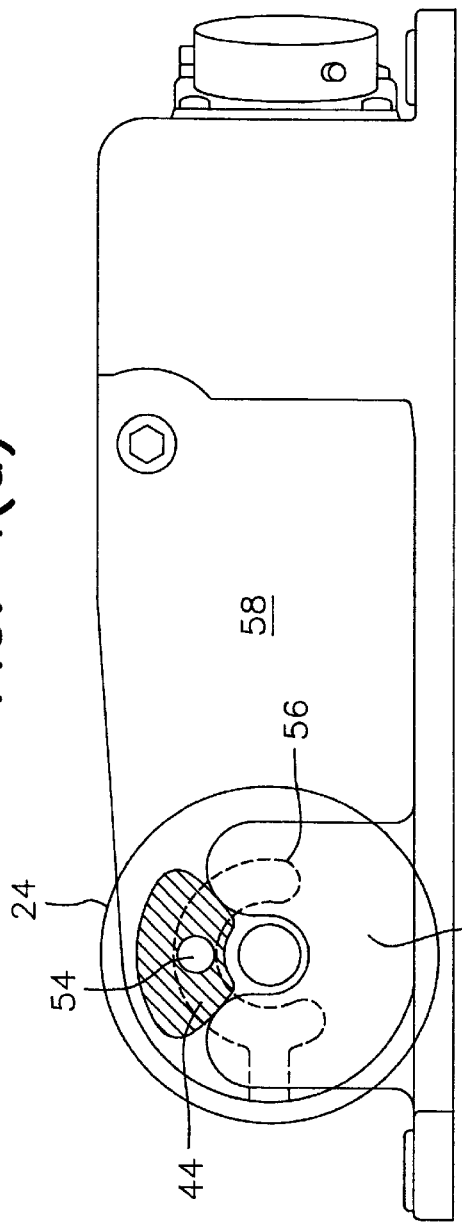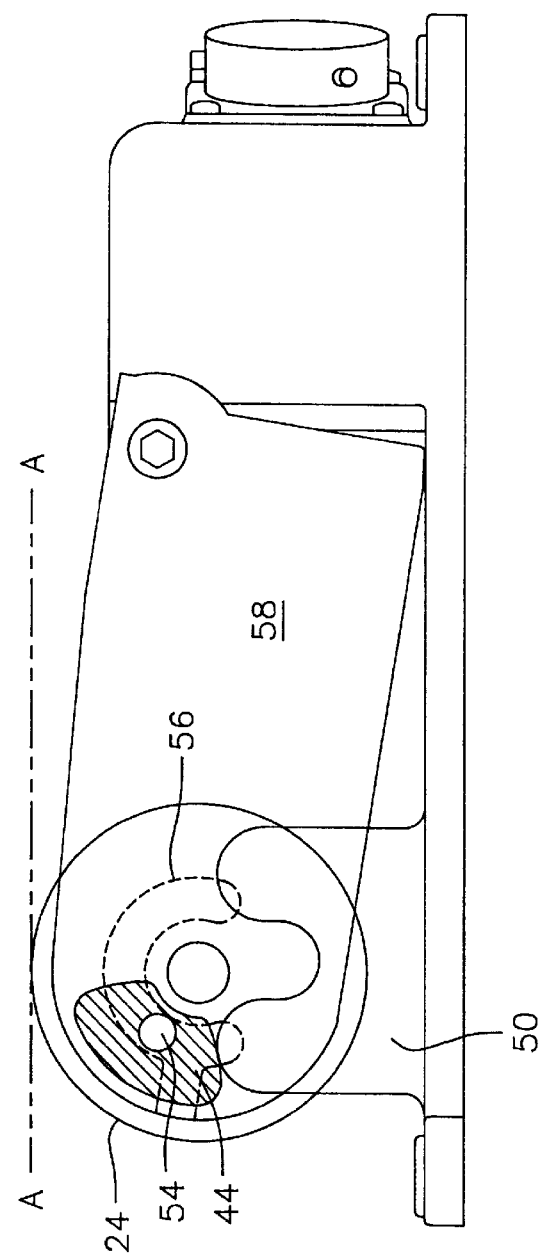

ROLLER DRIVE UNIT

BACKGROUND OF THE INVENTION

The invention pertains to a roller drive unit with:
a roller
a motor to drive the roller
a drive shaft coupled to the motor
a gear system to couple the roller to the drive shaft whereby the gear system has:
  a drive gear coupled in a non-rotating manner to the drive shaft and
  a driven gear coupled to the roller on the one hand and to the drive gear on the other
a support element on which the roller is supported in a rotary manner and which is in turn rotatable about the axis of the roller,
a device for limiting the angular range about which the support element rotates and
a supporting device for receiving the force acting by means of a load on the roller.

Roller drive units similar to this are known. Such roller drive units are used, for example, for conveying freight holders which are placed on roller conveyors. Such freight holders can be containers or pallets. A preferred field of application for the roller drive unit shown is a freight-loading system in air freight traffic in which the containers are driven into the cargo space of an aircraft and are stowed there. The roller drive unit is accordingly installed in the aircraft itself.

An example of a known roller drive unit is shown in DE-C-3 911 214 (U.S. Pat. No. 5,048,672). The known roller drive unit uses a swivel element as a basic supporting feature. This swivel element supports the roller. The swivel element is supported by the drive shaft and the drive shaft is supported by the frame. With this type of arrangement the driving forces are carried through the drive shaft to the aircraft structure.

To raise the roller the swivel element is rotated around the drive shaft. The roller rises due to the eccentric location of the drive shaft. The transfer of drive forces therefore transmits an undesirable bending moment to the drive shaft.

A similar roller drive unit is described in DE-C-3 724 126. Here the stator supports the roller. It is swivel mounted and swings around the axle to raise the roller. Also here the driving forces are carried to the frame through the drive shaft.

From DE-C-4 336 978 another power drive roller is known which increases the vertical force of the roller by using the reaction force of the planetary gear to depress a spring thereby transferring the driving forces to the structure.

SUMMARY OF THE INVENTION

The task of the invention is to further develop a roller drive unit in such a way that the roller drive unit is improved in all operating positions. In particular the drive shaft should not be used to carry the driving forces to the structure and when returning to the rest position the roller should not be allowed to overrun.

In the case of a roller drive unit of the aforementioned type, this problem is solved according to the invention in that the support element carries at least one eccentric cam and the eccentric cam is supported on the cam support. The flow of forces passes through the eccentric cam directly to the cam support. The forces on the drive shaft are therefore torsion as no bending moment is present.

Due to the inertia of the overall arrangement, the frictional forces in the gear system and the leverage ratios, on starting the motor the support element is initially rotated about the roller axis. When the roller touches the container located above it, or on reaching the limit of the permitted rotation angle, the planet gears start to rotate about their axes.

To assist in this initial vertical movement it is possible to add a braking function between the support element and the motor driven roller elements. This is most easily done by placing a slip clutch between the support element and one or more of the planet gears.

The drive shaft is located within the support element and is supported by two bearings to allow it to rotate without undo friction. Bearings are also foreseen between the roller and the support element.

In principle the previously described elements can be located in several different relationships to another. However when the roller, the drive shaft and the intermediate gears are arranged to form a planetary gear system the entire arrangement becomes very compact.

When a cam is mounted on both external sides of the support element the vertical forces on each are reduced. These forces are carried to the structure more symmetrically which provides a valuable mechanical advantage.

The easiest way to limit the rotation of the cam carrying support element is by a protrusion in either the support element or the supporting structure which moves within an arcuate slot in the other element. The limits on the rotation are therefore determined by the length of the slot.

In order to ensure that the roller returns to the lowered position without driving past the bottom and rising on the other side, it is preferable that the cam support has at least partly a convex shape and the cam in the rest position of the roller has a corresponding concave shape. The shape of these two elements can, of course, be reversed to the same effect.

BRIEF DESCRIPTION OF THE DRAWINGS

The invention is described in greater detail hereinafter relative to a preferred embodiment and with reference to the attached drawings, wherein:

FIG. 2a and FIG. 2b show a partially sectioned view of the roller drive unit in FIG. 1 seen in the transport direction, that is a section perpendicular to the side view.

FIG. 3a and FIG. 3b show a partially sectioned side view of the unit in FIG. 1 at right angles to the transportation direction.

FIG. 4a and FIG. 4b show an alternate cam arrangement of the roller drive unit shown in FIG. 1.

DETAILED DESCRIPTION OF THE PREFERRED EMBODIMENT

Figure 1:
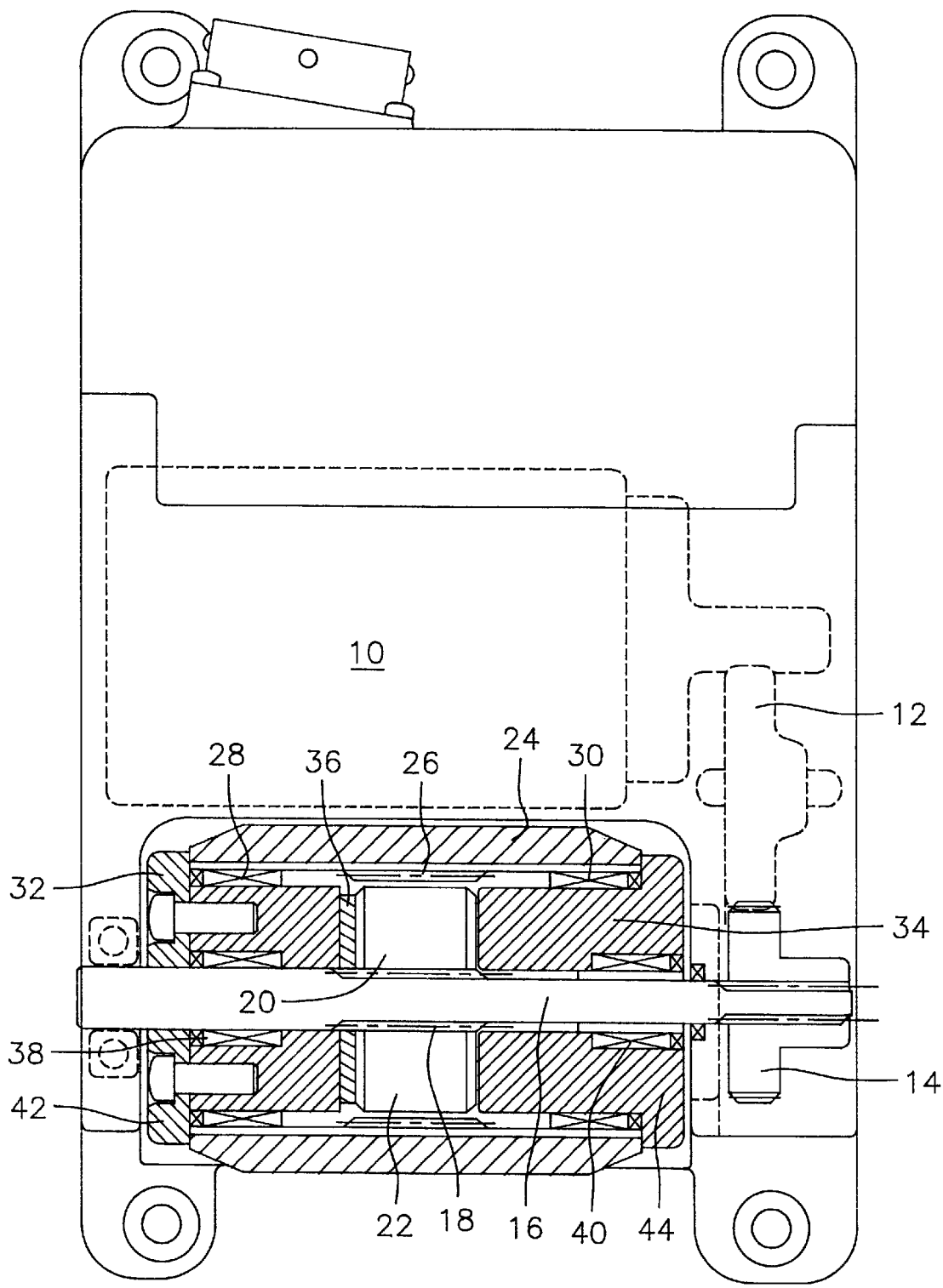
FIG. 1 shows a plan view of an embodiment of the roller drive unit according to the invention, partly in section.

In the roller drive unit described in the drawings a motor 10 drives, through gears 12 and 14, the drive shaft 16. A gear section 18 in the drive shaft 16 forms the sun gear in a planetary system. This gear is mated to planet gears 20, 21 and 22. These gears mate with the ring gear 26 mounted on the inside surface of the roller 24. The roller 24 has an elastometric material bonded to the outside surface. The roller 24 has bearings 28 and 30 on each end between it and the support element 34. The support element 34 has a slip clutch 36 between it and the gears 20, 21 and 22. The drive shaft 16 is located at the axis of roller 24 and penetrates through the support element. It turns within the bearings 38 and 40 mounted therein.

The support element has cams 42 and 44 located at each end.

The planet gears 20, 21 and 22 revolve about their axles in the support element 34. Of these axles, only one axle 46 is shown in the planet gear 21 in FIG. 2a.

The cams 42 and 44 are supported by cam supports 48 and 50 attached to the support frame.

In the example shown, the cam 44 contains a stop pin 54 which moves in a arcuate slot 56 in the roller support structure 58. The cam support 50 is located between the roller 24 and the support structure 58.

The operation of the roller drive unit shown in the drawing is described as follows:

FIG. 3a shows the rest position of the roller drive unit. In this rest position the two cams 42 and 44 allow the roller 24 to drop under its own weight to its lowest rest position. When the motor 10 drives the drive shaft 16 and therefore the planet gears 20, 21 and 22, the slip clutch 36 combined with the friction in the gearing and the difference in the lever arms cause the planet gears to remain stationary relative to the support element while the whole roller assembly including the cams 42 and 44 and the roller support element 34 as well as the roller 24 to revolve around the axis of the roller 24.

When the roller assembly rotates the cams 42 and 44 press against the cam supports 48 and 50 causing the roller assembly to raise until the roller 24 contacts the container located above it. When the roller contacts the container, or when the stop pin 54 shown in FIG. 3b reaches the end of the slot 56, the rotation of the cams 42 and 44 is no longer possible. The clutch force is overcome and the drive shaft 16 causes the planet gears 20, 21 and 22 to rotate about their own axles. These turn the roller 24 transporting the container in the required direction.

Line A—A indicates a level above the system height which represents the maximum height at which transport will occur.

In FIG. 3a and FIG. 3b the cam support 50 (shown in section) in which the cam 44 sits has a convex form. In the rest position the cam 44 has a corresponding concave form. Through this method the tendency of the roller to rotate through the rest position and rise in the other direction is inhibited. The previously described function of the cam 44 and its relationship to the cam support 50 also goes naturally for the cam 42 on the cam support 48.

FIG. 4a and FIG. 4b show a further embodiment of the cam arrangement. In this embodiment the cam 42 and 44 are located above the axis. This has the advantage of reducing the friction between the cam 42 and 44 and the cam support 48 and 50 as the cam rolls on the cam support rather than slides. In contrast to the prior art in this arrangement the cam (and the roller assembly) centers itself more securely between the two halves of the cam support when the motor is shut off thereby preventing the roller from going through the rest position and rising on the other side.

I claim:

1. A roller drive unit comprising:
   a roller,
   a motor to drive the roller,
   a drive shaft coupled to the motor,
   a gear system to couple the roller to the drive shaft, the gear system including:
     a drive gear coupled in a non-rotating manner to the drive shaft, and
     a driven gear coupled to the roller and to the drive gear,
   a support element on which the roller is supported in a rotary manner and which is in turn rotatable about an axis of the roller,
   a device for limiting an angular range about which the support element rotates, and
   a supporting device for receiving a force created by a weight of a load carried on the roller,
   wherein the support element carries at least one eccentric cam and the eccentric cam is supported on the supporting device.

2. A roller drive unit according to claim 1, wherein a slip clutch is placed between the support element and one of the drive shaft, the drive gear, the driven gear and the roller.

3. A roller drive unit according to claim 2, wherein the slip clutch is placed between the support element and the driven gear.

4. A roller drive unit according to claim 1, wherein the drive shaft is mounted in a rotary manner in the support element.

5. A roller drive unit according to claim 4, wherein a bearing is placed between the drive shaft and the support element.

6. A roller drive unit according to claim 1, wherein a bearing is placed between the roller and the support element.

7. A roller drive unit according to claim 1, wherein the roller, the planet gears (20, 21, 22) driven gear and the drive gear form a planetary gear arrangement.

8. A roller drive unit according to claim 1, wherein the support element contains an eccentric cam located adjacent to each end of an external face of the roller.

9. A roller drive unit according to claim 1, wherein a limiting mechanism for the rotation of the support element contains a stop pin which moves within a constrained arcuate slot.

10. A roller drive unit according to claim 1, wherein the supporting device has at least one convex contour and, at least in an area corresponding to a neutral position of the roller, the eccentric cam has a concave contour.

11. A roller drive unit according to claim 1, wherein the supporting device has at least one concave contour and, at least in an area corresponding to a neutral position of the roller, the eccentric cam has a convex contour.

12. A vehicle with a roller drive unit, said roller drive unit comprising:
    a roller,
    a motor to drive the roller,
    a drive shaft coupled to the motor,
    a gear system to couple the roller to the drive shaft, the gear system including:
      a drive gear coupled in a non-rotating manner to the drive shaft, and
      a driven gear coupled to the roller and to the drive gear,
    a support element on which the roller is supported in a rotary manner and which is in turn rotatable about an axis of the roller,
    a device for limiting an angular range about which the support element rotates, and
    a supporting device for receiving a force created by a weight of a load carried on the roller,
    wherein the support element carries at least one eccentric cam and the eccentric cam is supported on the supporting device.

13. A vehicle according to claim 12, wherein the vehicle is an aircraft.

* * * * *